US 8,489,700 B2

(12) United States Patent
May et al.

(10) Patent No.: US 8,489,700 B2
(45) Date of Patent: Jul. 16, 2013

(54) ANALYSIS OF NODAL AFFINITY BEHAVIOR

(75) Inventors: Henry J. May, Mantorville, MN (US); Richard K. Kirkman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1955 days.

(21) Appl. No.: 11/290,883

(22) Filed: Nov. 30, 2005

(65) Prior Publication Data

US 2007/0124457 A1    May 31, 2007

(51) Int. Cl.
*G06F 15/167* (2006.01)
*G06F 15/173* (2006.01)
*G06F 9/46* (2006.01)

(52) U.S. Cl.
USPC ........... 709/216; 709/224; 709/226; 718/104; 718/105

(58) Field of Classification Search
USPC ................... 709/216, 224, 226; 718/104, 105
See application file for complete search history.

(56) References Cited

U.S. PATENT DOCUMENTS

| | | | | |
|---|---|---|---|---|
| 5,237,673 | A * | 8/1993 | Orbits et al. | 711/170 |
| 5,692,192 | A * | 11/1997 | Sudo | 718/105 |
| 5,796,633 | A * | 8/1998 | Burgess et al. | 702/187 |
| 6,105,053 | A * | 8/2000 | Kimmel et al. | 718/105 |
| 6,701,421 | B1 * | 3/2004 | Elnozahy et al. | 711/170 |
| 6,769,017 | B1 * | 7/2004 | Bhat et al. | 709/214 |
| 7,171,464 | B1 * | 1/2007 | Raghuraman et al. | 709/224 |
| 2001/0039559 | A1 * | 11/2001 | Eilert et al. | 709/104 |
| 2003/0061265 | A1 * | 3/2003 | Maso et al. | 709/105 |
| 2003/0069939 | A1 * | 4/2003 | Russell | 709/214 |
| 2003/0195959 | A1 * | 10/2003 | Labadie et al. | 709/224 |

OTHER PUBLICATIONS

Armstrong, et al., U.S. Appl. No. 10/022,982, filed Dec. 17, 2001, "Dynamic Diagnostic Program for Determining Thread Wait Time".
Chung, et al., U.S. Appl. No. 10/403,150, filed Mar. 31, 2003, "Application-Based Control of Hardware Resource Allocation".
Allen, et al., U.S. Appl. No. 10/438,393, filed May 15, 2003, "Methods, Systems, and Media for Managing Dynamic Storage".
Chung, et al., U.S. Appl. No. 10/793,346, filed Mar. 4, 2004, "Mechanism for Reducing Remote Memory Accesses to Shared Data in a Multi-Nodal Computer System".
Chung, et al., U.S. Appl. No. 10/793,347, filed Mar. 4, 2004, "Mechanism for Assigning Home Nodes to Newly Created Threads".
Chung, et al., U.S. Appl. No. 10/793,470, filed Mar. 4, 2004, "Mechanism for Dynamic Workload Rebalancing in a Multi-Nodal Computer System".
Chung, et al., U.S. Appl. No. 10/793,476, filed Mar. 4, 2004, "Mechanism for Enabling the Distribution of Operating System Resources in a Multi-Node Computer System".
Allen, et al. U.S. Appl. No. 11/239,597, filed Sep. 29, 2005, "Memory Allocation in a Multi-Node Computer".

* cited by examiner

*Primary Examiner* — Boris Gorney
(74) *Attorney, Agent, or Firm* — Patterson & Sheridan LLP

(57) ABSTRACT

Method for measuring the performance of a multi-nodal computer system. In one embodiment, a number of system related events may be instrumented. When an instrumented event occurs, instrumentation routines may be invoked to record the state of system variables related to the event. In particular, events such as thread creation, dispatch, and nodal events such as events related to verifying or changing workload distribution in a multi-nodal system, among others, may be instrumented to record the state of variables as these events occur in a running multi-nodal computer system.

20 Claims, 4 Drawing Sheets

ANALYSIS OF NODAL AFFINITY BEHAVIOR

CROSS-REFERENCE TO RELATED APPLICATIONS

This application is related to the following: commonly assigned, co-pending, U.S. patent application Ser. No. 10/793,476, filed Mar. 4, 2004, titled "Mechanism for Enabling the Distribution of Operating System Resources in a Multi-Node Computer System;" commonly assigned, co-pending U.S. patent application Ser. No. 10/793,470, filed Mar. 4, 2004, titled "Mechanism for Dynamic Workload Rebalancing in a Multi-Nodal Computer System;" and commonly assigned, co-pending U.S. patent application Ser. No. 10/793,347, filed Mar. 4, 2004, titled "Mechanism for Assigning Home Nodes to Newly Created Threads"; each of which are incorporated fully by reference herein.

BACKGROUND OF THE INVENTION

1. Field of the Invention

The present invention generally relates to the analysis of computer system performance. More specifically, the present invention relates to a performance analysis tool used to measure the performance of a multi-nodal computer system.

2. Description of the Related Art

Computer systems are widely used to manipulate and store data. Typically, data is stored in a computer system memory and manipulated by application programs executing on a central processing unit (CPU). Many operating systems are capable of multi-tasking, i.e., they are capable of simultaneously executing many different tasks or processes. For example, many operating systems support the use of "threads." Generally, a thread provides a unit of execution represented by a sequence of instructions and associated data variables. Threads may be executed in parallel with one another, either through time slicing or multiprocessing.

As computer applications have grown in complexity, one approach to increasing system performance has been to design computer systems with multiple CPUs. In one approach, a computer system may be configured with multiple nodes, each node containing one or more CPUs and a local memory. Computer systems such as this may include many nodes and use a sophisticated bus and caching mechanism to transfer data among the different nodes. Typically, each node may access the local memory of any other node; however, doing so may take significantly longer than the time required to access memory for a local node.

Configuring each node with its own processing and memory resources is generally referred to as a NUMA (non-uniform memory access) architecture. A distinguishing feature of a NUMA system is that the time required to access memory locations is not uniform, i.e., access times to different locations can be different depending on the node making the request and the location of the memory being accessed. In particular, memory access by a CPU to memory on the same node as the CPU takes less time than a memory access by the CPU to memory on a different node. Access to memory on the same node is faster because access to memory on a remote node must pass through more hardware components e.g., buses, bus drivers, memory controllers, etc., between nodes to reach the requesting CPU.

For a computer system configured with a NUMA architecture, it is clearly advantageous to minimize the number of references made from a CPU to remote memory. Similarly, when a thread makes a dynamic request for memory, e.g., through program language calls to malloc( ) or new( ), or when data is read from disk, application performance is improved when memory is allocated from the local memory of the CPU executing the thread.

The amount of separation between nodes is generally referred to as "memory affinity" or more simply "affinity." A node has the greatest affinity with itself, because its CPU(s) can access the local memory region associated with the node faster than they can access memory on other nodes. The affinity between a local node and a remote node decreases as the degree of hardware separation between the local and remote node increases.

A number of mechanisms have been developed for maximizing the utilization of nodal affinity. For example, U.S. patent application Ser. No. 10/793,347, filed Mar. 4, 2004, titled "Mechanism for Assigning Home Nodes to Newly Created Threads" discloses a technique for initially assigning a home node to each thread (i.e., a node to preferentially execute the thread), and U.S. patent application Ser. No. 10/793,470, filed Mar. 4, 2004, titled "Mechanism for Dynamic Workload Rebalancing in a Multi-Nodal Computer System" discloses methods for ensuring that as the workload being performed by the various threads and processes executing on the system changes, that the workload across the nodes remains balanced to reflect the changes in workload.

However, monitoring and analyzing the performance characteristics of a multi-nodal system as work ebbs and flows over time remains very difficult as system administrators lack access to data characterizing system performance. Without a direct mechanism to monitor system performance, a system administrator may be left to guess at the underlying cause of certain aspects of system behavior and to determine or measure the impact of changes to the system in an ad-hoc or unrefined manner. Because of the complexity of most NUMA systems, this approach fails to provide an adequate analysis of the performance characteristics of the system, or of the impact of changes to the computing resources or configuration of such a system. Accordingly, there remains a need for a performance analysis tool used to measure the performance of a multi-nodal computer system.

SUMMARY OF THE INVENTION

Embodiments of the invention generally include a method for measuring the performance of a multi-nodal computer system.

One embodiment provides a method of monitoring the performance of a multi-nodal computer system. The method generally includes instrumenting a set of system events related to the distribution of workload across each of the nodes of the multi-nodal computer system, and when an instrumented event occurs over the course of executing a thread on the mutli-nodal computer system, performing an instrumentation routine, wherein the instrumentation routine is configured to record data regarding the existing state of the multi-nodal computer system. The method generally further includes continuing to execute the thread after performing the instrumentation routine.

BRIEF DESCRIPTION OF THE DRAWINGS

So that the manner in which the above recited features of the invention can be understood, a more particular description of the invention, briefly summarized above, may be had by reference to the exemplary embodiments that are illustrated in the appended drawings. Note, however, that the appended drawings illustrate only typical embodiments of this inven

DETAILED DESCRIPTION OF THE PREFERRED EMBODIMENTS

Embodiments of the invention generally include a method, apparatus, and article of manufacture for measuring the performance of a multi-nodal computer system. In one embodiment, a number of system related events may be instrumented. When a system event occurs during thread execution, instrumentation routines may be invoked to record the state of system variables related to the event. For example, system events such as thread creation, dispatch, and nodal events such as events related to verifying or changing workload distribution in a multi-nodal system, among others, may be instrumented to record the state of variables as events occur in a running multi-nodal computer system.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention may be implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in a variety of ways.

FIG. 1 is a block diagram illustrating a first exemplary computing environment, according to one embodiment of the invention. Computing system 100 provides a multi-nodal computer system. In a preferred embodiment the computing system 100 may comprise a i-Series server utilizing the POWER4 processor (or a successor thereto) running a version of the I5/OS at V5R4 or later, both available from International Business Machines (IBM), although other multi-nodal computer systems may be used. As shown computing system 100 includes one or more processing nodes 130, network interface 125, user interface 150 and mass storage 155. Computing system 100 is shown with four processing nodes 130, although more or fewer nodes may be used depending on the configuration of a particular computing system 100. Network interface 125 is used to communicate with other computer systems. User interface 150 is used to accept commands, invoke application programs, and to process input/output between processing nodes 130 and users of the computing system 100. Each node 130 is shown running an operating system 136 that provides kernel services 137.

Figure 1A:
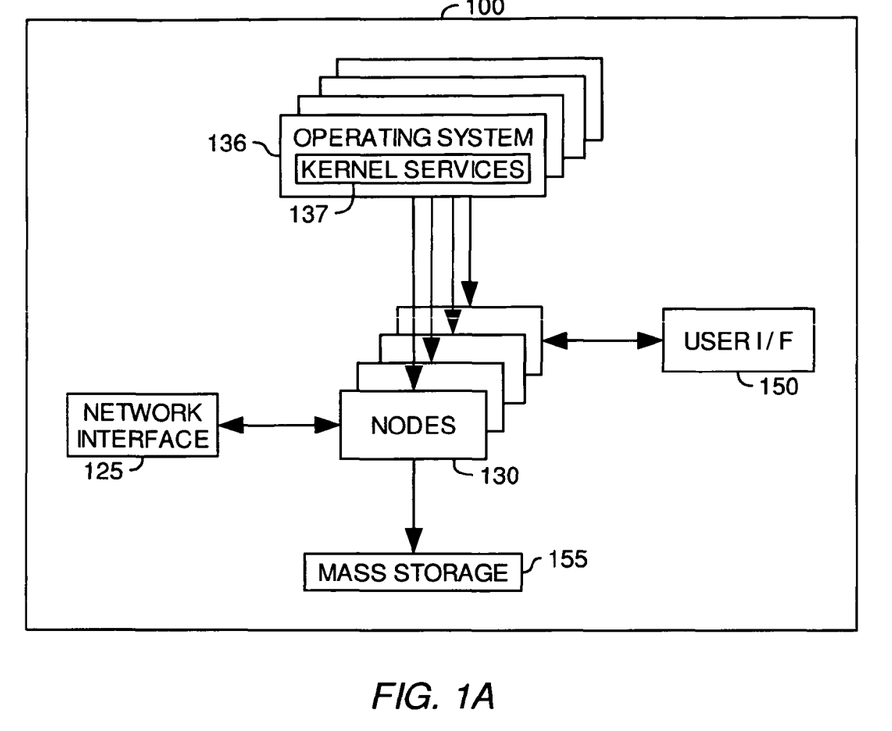
- FIG. 1A is a block diagram illustrating an exemplary computing environment, according to one embodiment of the invention.
Figure 1B:
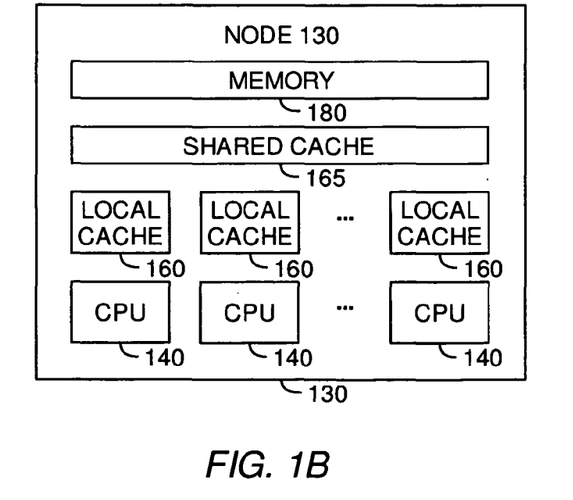
FIG. 1B is a block diagram further illustrating a computing node, according to one embodiment of the invention.

FIG. 1B illustrates a more detailed view of a computing node 130, according to one embodiment of the invention. As shown, node 130 includes a set of hardware resources, e.g., a shared memory 180, one or more processor(s) 140, and one or more levels of cache memory such as shared cache 165 and local cache 160. In a computer system 100 configured using a NUMA architecture, the hardware resources 140-180 in each node 130 have the ability to interact more efficiently with one another than when interacting or communicating with similar resources of another node 130.

The architecture and nodal-partitioning scheme illustrated in FIGS. 1A and 1B, however, provide an exemplary computer system architecture, and other schemes used to provide physical partitioning of hardware resources may be used in alternative embodiments of the invention. Moreover, other non-NUMA based architectures may use the performance analysis tool of the present invention. For example, embodiments may be used to monitor the performance of a system configured to assign threads to different processors that share a given memory using a uniform access method, or otherwise allocate hardware resources that are not partitioned into nodes as illustrated in FIGS. 1A, and 1B.

Figure 2:
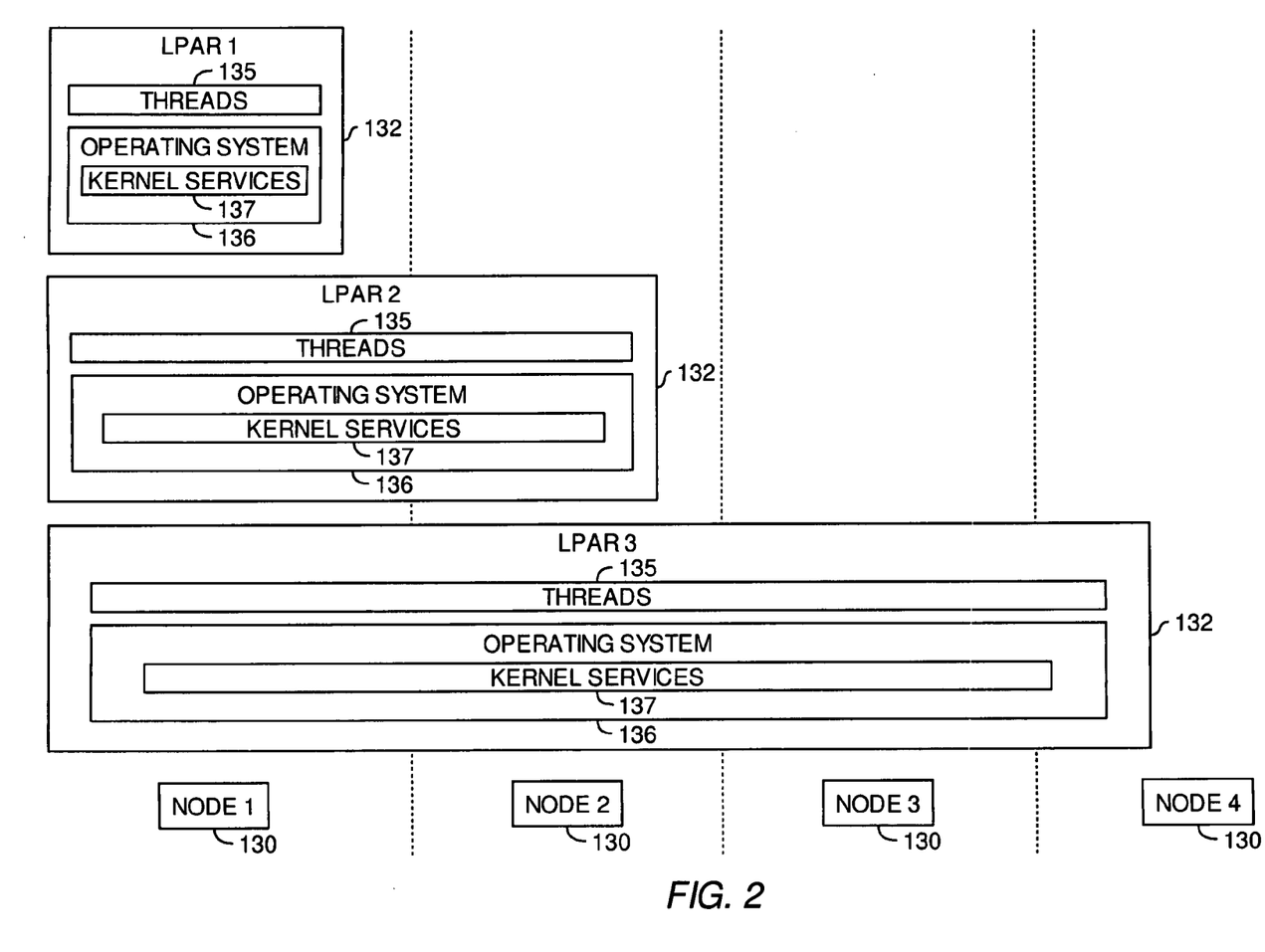
FIG. 2 is a block diagram further illustrating an exemplary computing environment, according to one embodiment of the invention.

FIG. 2 is a block diagram further illustrating an exemplary computing environment 100, according to one embodiment of the invention. As shown, FIG. 2 illustrates a logically partitioned system that includes three logical partitions 132 (labeled as LPAR 1, LPAR 2, and LPAR 3). A logical partition (LPAR) is the division of the processors, memory, and storage of a computer system (e.g., of nodes 130) into multiple sets of resources so that each set of resources can be operated independently with its own operating system 136 instance and application space. The number of logical partitions 132 that can be created depends on the system processor configuration and other available hardware resources. As shown, logical partitions 132 are defined to operate using resources allocated from nodes 130. Also as shown, each logical partition 132 includes a running operating system 136 that provides kernel services 137. As used herein, the terms "system" or "computing system" may refer to both non-partitioned and logically partitioned systems. A logical partition 132 may use fewer than all of the nodes 130 provided by a computing system 100 as is the case with LPAR 1 and LPAR 2. It is also possible for one node to provide resources included in more than one logical partition, as is the case for nodes 1 and 2. Many of the instrumented events of the present invention are triggered by the assigning and adjusting of how (or when) threads are dispatched for execution among the nodes 130 of a system 100. Thus, when the configuration of the partitions in system 100 is changed, the analysis tool of the present invention may be used to measure the impact of such changes to the performance of each partition in the system 100.

Each logical partition is shown to include threads 135 and operating system 136. Integrated into operating systems 136 are kernel services 137. Kernel services provide operating system level services to other operating system processes and to other application programs. In general, an operating system kernel is a fundamental element of an operating system. The kernel services 137 provide a software component responsible for providing application programs (e.g., threads) with secure access to the hardware provided by nodes 130. Since there are typically many programs running on each partition, and access to the hardware is limited, kernel services 137 are also responsible for deciding when and for how long a thread 135 should be executed on a given node 130. Concurrent with the operations of thread creation, dispatch, and execution of threads 135, instrumented events are triggered to record the state of system variables.

Figure 3:
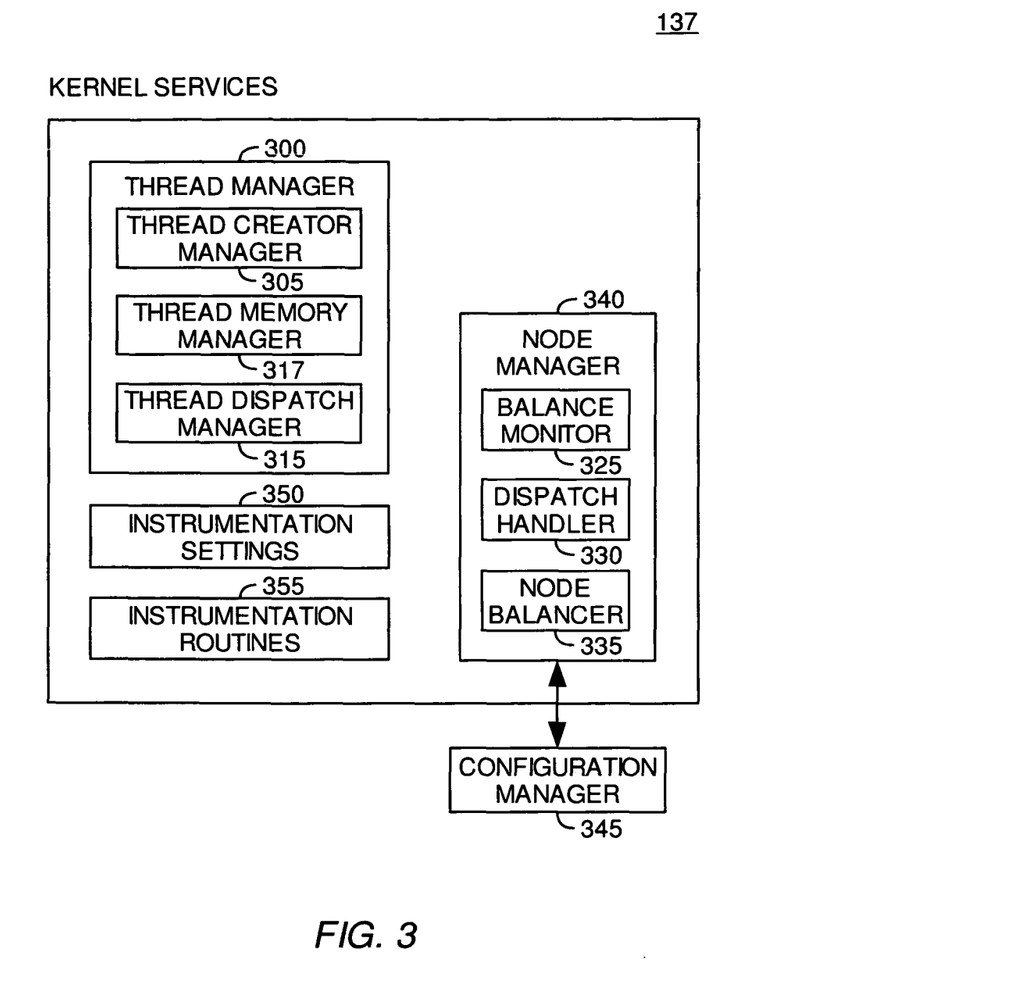
FIG. 3 is a block diagram showing an expanded view of the kernel services provided by an operating system, according to one embodiment of the invention.

FIG. 3 is a block diagram showing an expanded view of the kernel services 137 provided by an operating system 136, according to one embodiment of the invention. As shown, kernel services 137 include thread manager 300, node manager 340, configuration manager 345, instrumentation settings 350, and instrumentation routines 355.

Thread manager 300 is further shown to include a thread creation manager 305, thread dispatch manager 315, and thread memory manager 317. In one embodiment, thread creation manager 305 is used to create executable threads along with the necessary thread control structures required for execution of the thread on computing system 100. Additionally, as part of the thread creation process, the thread creation manager 305 may assign each thread a home node. Home node assignment is important because thread dispatch manager 315 is biased to execute threads on the assigned home node when possible and thread memory manger 317 is biased to allocate memory from the assigned home node when possible.

After a thread has been created and assigned to a home node by thread creation manager 305, it may be dispatched for execution by thread dispatch manager 315. Generally, a thread may be executed on any one of the processors provided by the various nodes 130 of the system. Although independent from one another, in one embodiment, threads may also be assigned to a grouping of threads. For example, multiple threads created by a single application may share several of the same data elements. So, there is an advantage to assigning the same home node to all of these threads. Accordingly, having each such thread assigned to the same group may increase system efficiency as each thread may access data elements from the memory of the same local node (i.e., from the node with the highest degree of affinity for each thread). Additional examples of the operations of thread manager 300 are described in commonly owned U.S. patent application Ser. No. 10/793,347 titled "Mechanism for Assigning Home Nodes to Newly Created Threads," which is incorporated herein by reference in its entirety.

FIG. 3 also shows node manager 340. In one embodiment, node manager 320 provides a kernel service configured to determine the relative workload of the various nodes in the system 100. For example, node manager 340 may be used to identify and correct workload imbalances within the system 100 and to notify other kernel services of adjustments or changes in nodal work load so that these services can also themselves adjust accordingly. Shown within Node Manager 340 are dispatch handler 330, balance monitor 325, and node balancer 335. As its name suggests, dispatch handler 330 is responsible for handling dispatch requests from thread dispatch manager 315. Since threads are continually being dispatched, dispatch handler 330 typically runs quite frequently. Balance monitor 325 is configured to periodically monitor the balance state of the workload being performed by the nodes 130. In a preferred embodiment, the balance monitor 325 is configured to determined balance information across multiple modes 130 every seven seconds. After obtaining balance information, balance monitor 325 may be configured to perform various calculations using the balance information that ultimately may be used by node balancer 335 to determine whether (and when) node balancing is required.

FIG. 3 also shows configuration manager 345. In one embodiment, configuration manager 345 may be configured to signal a configuration change to node balancer 335. Node balancer 335 then processes the configuration change and takes appropriate action to adjust the balance of work distribution and across multiple nodes of a multi-nodal computer system. Examples of configuration changes include increasing or reducing the number of processors or memory on the system. Further, a configuration change may include changes to the resources available to a logical partition 132 or may reflect changes made to the underlying physical set of hardware resources provided by computing system 100. Although shown as outside of kernel services 137, in an alterative embodiment the configuration manager 345 may be part of the operating system kernel services.

The operations of the node manager 340, the balance monitor 325, the node balancer 335, and the configuration manager 345 to identify and handle workload balancing and adjustments are further described in a commonly owned U.S. patent application Ser. No. 10/793,470 titled "Mechanism for Dynamic Workload Rebalancing in a Multi-Nodal Computer System" which is incorporated herein by reference in its entirety.

FIG. 3 also shows instrumentation settings 350 and instrumentation routines 355. In one embodiment, the instrumentation settings 350 identify which system events should be instrumented. Generally, instrumenting is a method of collecting data about a computer system or the programs or threads executing thereon. Executable segments of code are instrumented by inserting instrumentation routines 155 into an executable program or operating system routine to count events, such as the number of times a section of the program executes, or to record data regarding the state of system at the moment of a system event such as the value of system or thread variables. Illustratively, instrumentation settings 350 identify which programs or operating system routines or events (e.g., which of kernel services 137) should be instrumented with an instrumentation routine 355. In turn, instrumentation routines 355 perform the instrumentation function whenever an instrumented event occurs during the operation of computer system 100. Instrumentation routines 355 are generally transparent to the operation of the system, other than for the additional processor cycles required to perform one of the instrumentation routines 355 when an instrumented event occurs.

Figure 4:
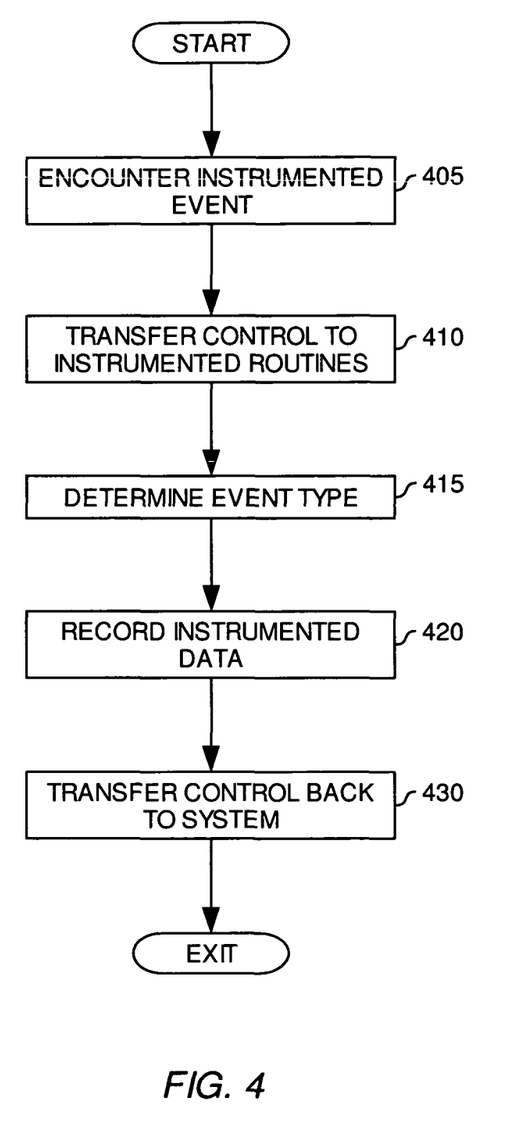
FIG. 4 is a flow diagram illustrating a method for monitoring the performance of a multi-nodal computer system, according to one embodiment of the invention.

FIG. 4 is a flow diagram illustrating a method for monitoring the performance of a multi-nodal computer system, according to one embodiment of the invention. The method 400 begins at step 405 where an instrumented event is encountered during the course of execution of computer system 100. Which events are instrumented may be determined in reference to instrumentation settings 350. An event includes anything that may occur during the course of operation of the system 100 along with any data of interest. For example, the dispatch handler 330 may be instrumented to collect data any time a task is dispatched to a processor. Interesting data for such an event include the thread identifier and the processor to which the thread is being dispatched. Paragraphs 36-48 provide a description of a variety of events that may occur in balancing work across a multi-nodal system.

At step 410, control is transferred to the appropriate instrumentation routine 355 associated with the instrumented event. In one embodiment, the instrumentation routine may be inserted directly into the executable instructions associated with the instrumented event. In such a case, the instrumentation routine will be performed as part of the executable code defining the event. In an alternative embodiment, the instrumentation routine 355 may be a hook to another process executing on the system. When the hook is encountered, control is transferred to the instrumentation process, which performs the instrumentation functions of recording data regarding the state of system 100. At step 415 the event type may be determined. For example, the instrumentation settings 350 may identify a variety of system events that may be instrumented. At step 420, based on the event type determined at step 415, the appropriate system data is recorded. Once completed, control of the system may be handed back to the system at step 430. If the instrumentation routine is inserted directly into the executable code of a kernel service 137, then the kernel service simply continues to execute. In an alternative embodiment, control of the system may be switched from an instrumentation process back to the routine that triggered the instrumented event.

The remaining paragraphs of this specification provide an exemplary list of events that may be instrumented. A description of what system variables and system data types may be recorded for an instrumented event by one of the instrumentation routines 355 is also provided. Illustratively, the variables and data elements described below are provided by the I5/OS operating system running on an i-Series IBM power server. Depending on the actual implementation using a particular computer system, however, 100, some, all, or different sets of system events and data variables may be available for instrumenting.

Change Configuration Event

A "change configuration" event is generated for each node 130 whenever processors and/or memory are added or removed from the logical configuration of a logical partition 132. Once the logical partition configuration is changed, the node manager 340 will subsequently begin assigning resources to newly created threads based on the new configuration of resources. In addition, the node balancer 335 may dynamically change the home nodes and/or affinity groups for existing threads to help balance the system workload. Table I lists a number of system variables and system data types that may be recorded for a "change configuration" event.

TABLE I

| Change Configuration Event | |
|---|---|
| uint32 | xTargetWeightModificationNumber; |
| uint16 | xWeightDifferentialThreshold; |
| uint8 | xNodeId; |
| uint8 | reserved; |
| // The remaining fields pertain to the node identified in the xNodeID field. | |
| uint16 | xNewTargetWeight; |
| uint16 | xNewLogicalProcessorCount; |
| uint32 | xNewMemoryPageCount; |
| uint16 | xOldTargetWeight; |
| uint16 | xOldLogicalProcessorCount; |
| uint32 | xOldMemoryPageCount; |
| uint16 | xCurrentWeight; |
| uint16 | xInitiationWeight; |
| uint16 | xTransitionWeight; |
| uint16 | xDispatcherLoadIndex; |

One example where this information would be useful would be in a logical partition that has resource added or removed. The user would configure instrumentation settings 350 so that instrumentation routines 355 are performed for the change configuration event prior to the configuration change. Once triggered, the instrumentation data retrieved for this event would show how the logical partition 132 reacted to the change. The following groups of events would also be likely to occur and have instrumentation data recorded:

Initial "balance configuration" events would indicate the operating system's initial response to the changed configuration, as it begins to migrate the workload and its own internal resources towards the new configuration. Periodic "check balance" events would indicate the current balance of the workload, and subsequent "balance configuration" events would show stepwise adjustments of the operating system's resources as the workload slowly migrates towards being in balance with the new configuration.

Periodic "verify balance" events would indicate on a larger scope whether the workload was out of balance sufficiently to warrant moving existing tasks to new home nodes. If indicated, a set of "analyze balance" events would confirm that moving tasks was warranted, and the underlying analysis would have selected which tasks to move. Subsequently there would be a "change task" event for each task whose home node was changed, and a "change group" event for each group whose home node was changed. Then the process would repeat itself as subsequent "verify balance" events would indicate monitoring as to whether addition movement of tasks may be warranted. The "change balancer state" would also indicate the node balancer's transitions between "verifying balance", "analyzing balance", and "moving tasks/groups."

Balance Configuration Event

"Balance configuration" events may be initially triggered in response to a change in the configuration of processor and/or memory resources in the partition (see the "change configuration" event above). With the change in configuration, the workload on the system will begin to migrate to a state of nodal balance with regard to the new resource configuration, and the operating system may adjust its own internal resources according to the migrating workload balance. "Balance configuration" events may be subsequently triggered as the workload migrates, to allow the operating system to periodically adjust its resources in a stepwise migration towards a state of balance with regard to the new resource configuration. Both the initial and all subsequent events are actually a set of "balance configuration" events, one for each node. Table II lists a number of system variables and system data types that may be recorded for a "balance configuration" event.

TABLE II

| | Balance Configuration Event |
|---|---|
| uint32 | xTargetWeightModificationNumber; |
| uint16 | xWeightDifferentialThreshold; |
| uint8 | xNodeId; |
| uint8 | reserved; |
| // The remaining fields pertain to the node identified by the xNodeId value. | |
| uint16 | xTargetWeight; |
| uint16 | xCurrentWeight; |
| uint16 | xTransitionWeight; |
| uint16 | xDispatcherLoadIndex; |

Check Balance Event

The "check balance" event may be triggered whenever the balance monitor 325 operates to monitor the balance of the workload being executed across the nodes 130 of computer system 100. The "check balance" event records resource affinity balance of the workload within the computer system 100 (or within one of the partitions 132). Periodically, the balance monitor 325 compares the existing workload balance with the desired workload balance based on the resource configuration, and uses this information (1) when assigning a home node or other resource affinity to new tasks, jobs, and threads, and (2) to drive the periodic rebalancing of the internal resources used by the kernel services 137 following a change in the resource affinity configuration. A "check balance" event is generated for each portion of the computer system's affinity resources during this periodic comparison. Table III lists a number of system variables and system data types that may be recorded for a "check balance" event.

TABLE III

| | Check Balance Event |
|---|---|
| uint32 | xCurrentWeightIntervalNumber; |
| uint8 | xNodeId; |
| uint8 | reserved1; |
| uint16 | reserved2; |
| // The remaining fields reflect data for each xNodeID identified above. | |
| uint16 | xTargetWeight; |
| uint16 | xCurrentWeight; |
| uint16 | xInitiationWeight; |
| uint16 | xDispatcherLoadIndex; |
| uint64 | xHomeNodeCyclesOnHomeNodeProcessors; |
| uint64 | xHomeNodeCyclesOnOtherNodeProcessors; |
| uint64 | xOtherNodeCyclesOnHomeNodeProcessors; |
| uint64 | xHomeNodeAllocatesOfHomeNodePages; |
| uint64 | xHomeNodeAllocatesOfOtherNodePages; |
| uint64 | xOtherNodeAllocatesOfHomeNodePages; |
| uint32 | xMoveableTaskCount; |

The
xHomeNodeCyclesOnHomeNodeProcessors,
xHomeNodeCyclesOnOtherNodeProcessors, and
xOtherNodeCyclesOnHomeNodeProcessors values represent the amount of time a node 130 is spending doing the work for threads assigned to the node as home node, how much time other nodes are spending doing work that belongs to this node, and how much time this node is spending doing work that would optimally be done by other nodes, respectively. These values (e.g., measured in cycles) give an indication of the current workload balance of the system and may be useful to node balancer 325 in assigning home nodes to new tasks and in determining when to engage in periodic nodal rebalancing of internal operating system resources.

The
xHomeNodeAllocatesOfHomeNodePages,
xHomeNodeAllocatesOfOtherNodePages, and
xOtherNodeAllocatesOfHomeNodePages
data values provide an indication of whether memory pages are being allocated optimally. Although the node balancer 325 may not use these particular values for to perform its own balancing functions, they can be useful to a human observer. For example, a large value in the xHomeNodeAllocatesOfOtherNodePages accompanied by a small value in xOtherNodeAllocatesOfHomeNodePage would indicate that a memory hungry application was running in the node 130. A system administrator may use additional tools (e.g., Jobwatcher, Collection Services) to identify which specific jobs, tasks or threads that were placing large requirements on the local memory particular node.

New work (e.g., threads created by thread creation manager 305) is added to a system is added in such a way as to maintain balance, so it is unlikely that simply starting new jobs will trigger many interesting events. If a newly created thread triggers work in existing server jobs, or if work completes imbalances may occur and the system will go through the sequence of events to balance the work across nodes.

Verify Balance Event

A "verify balance" event occurs whenever the balance monitor 325 performs an operation to verify the resource affinity balance of the workload within the partition. For example, the balance monitor 325 may periodically compare the existing workload balance with the desired workload balance based on the resource configuration, and uses this information to determine whether there is sufficient imbalance to justify changing the home nodes (or other affinity assignments) to achieve a better workload balance of some threads or thread groups being executed. A "verify balance" event may be generated for each element of the computer system's 100 affinity resources during this periodic comparison. Table IV lists a number of system variables and system data types that may be recorded for a "verify balance" event.

TABLE IV

| | Verify Balance Event |
|---|---|
| uint32 | xObserveBalanceIntervalNumber; |
| uint8 | xNodeId; |
| uint8 | reserved; |
| uint16 | xDispatcherLoadIndex; |
| uint64 | xExecutedHomeNodeCycles; |
| uint64 | xTargetHomeNodeCycles; |
| uint64 | xThresholdHomeNodeCycles; |

Analyze Balance Event

The "analyze balance" event may be triggered whenever the balance monitor 325 performs an operation to analyze the resource affinity balance of the workload within computer system 100 (or partition 132). Once the balance monitor 325 has determined that there is sufficient workload imbalance to justify changing the portion of the resources with which some tasks, jobs, or threads have affinity, then it may be configured to analyze the workload and current affinity assignments to select which threads have an affinity assignment (e.g., a home node) that should be changed. An "analyze balance" event is generated for each of the computer system's 100 affinity resources during this analysis. Table V lists a number of system variables and system data types that may be recorded for an "analyze balance" event.

TABLE V

Analyze Balance Event

| | |
|---|---|
| uint32 | xRecordingPeriodId; |
| uint8 | xNodeId; |
| uint8 | reserved; |
| uint16 | xDispatcherLoadIndex; |
| uint64 | xExecutedHomeNodeCycles; |
| uint64 | xTargetHomeNodeCycles; |
| uint64 | xThresholdHomeNodeCycles; |

Change Balancer State Event

A change balancer state occurs whenever the state of the node manager 340 changes from one state to another. For example, the node manager 340 may transition between the above states of "check balance," "verify balance," and "analyze balance." A "change balance event" may be generated each time the state changes. Table VI lists a number of system variables and system data types that may be recorded for a "change balancer state" event.

TABLE VI

Change Balancer State Event

| | |
|---|---|
| uint64 | xController; |
| uint8 | xNewState; |
| uint8 | xOldState; |

Change Task Event

A change task event may be triggered whenever changes to the workload or resources assigned to the partition have resulted in an imbalance across the nodes. As described in the "Mechanism for Enabling the Distribution of Operating System Resources in a Multi-Node Computer System," U.S. patent application referenced above, every task, including jobs and threads, may have an affinity for different resources provided by the nodes of a computer system 100. A "change task" event may be triggered whenever the resource with which a thread has an affinity is changed. For example, if the node balancer 335 determines to balance the system by changing the home node of a thread, a "change task" may occur. Table VII lists a number of system variables and system data types that may be recorded for a "change task" event.

TABLE VII

Change Task Event

| | |
|---|---|
| uint32 | xRecordingPeriodId; |
| uint8 | xNewHomeNodeId; |
| uint8 | xOldHomeNodeId; |
| uint16 | reserved; |
| uint64 | xTotalNumberOfCyclesToMove; |
| uint64 | xCyclesRecordedByMovedTask; |
| uint64 | xTaskCountOfMovingTask; |

Change Group Event

Like the "change task" event, the "change group" event occurs when the affinity associated with a group of threads is changed. As described above, threads may be part of an affinity group. A group of threads assigned to the same affinity group have an affinity for the same collection of the resources provided by computing system 100. A "change group" event may be triggered whenever the resources associated with a thread affinity group is changed. For example, if the node balancer 335 determines to balance the system by changing the home node associated with a thread affinity group, a "change group" may occur. Table VIII lists a set of system variables and system data types that may be recorded for a "change group" event.

TABLE VIII

Change Group Event

| | |
|---|---|
| uint32 | xRecordingPeriodId; |
| uint8 | xNewHomeNodeId; |
| uint8 | xOldHomeNodeId; |
| uint8 | xGroupPreferredNodeId; |
| uint8 | reserved; |
| uint64 | xTotalNumberOfCyclesToMove; |
| uint64 | xCyclesRecordedByMovedGroup; |
| uint64 | xInitialThreadTaskCount; |
| uint32 | xGroupId; |

The above list of events is not meant to be exhaustive of the invention that may be instrumented using the performance analysis mechanisms of the present invention; instead more, or fewer, events may be used in a particular case.

While the foregoing is directed to embodiments of the present invention, other and further embodiments of the invention may be devised without departing from the basic scope thereof and the scope thereof is determined by the claims that follow.

What is claimed is:

1. A method of monitoring the performance of a multi-nodal computer system, comprising:
instrumenting a set of system events to define a plurality of instrumented events, wherein the system events are related to the distribution of workload across each of the nodes of the multi-nodal computer system and wherein instrumenting comprises associating the system events with respective instrumentation routines which are invoked upon occurrence of the respective instrumented event;
when an instrumented event, of the plurality of instrumented events, occurs over the course of executing a thread on the multi-nodal computer system, performing a respective instrumentation routine, wherein the instrumentation routine is configured to record data regarding the existing state of the multi-nodal computer system; and
continuing to execute the thread after performing the instrumentation routine.

2. The method of claim 1, wherein each node of the multi-nodal computer system includes a set of one or more central processing units (CPUs) and a local memory store.

3. The method of claim 2, wherein each node of the multi-nodal computer system may access the local memory store of any other node.

4. The method of claim 2, wherein the multi-nodal computer system is configured using a non-uniform memory access (NUMA) architecture.

5. The method of claim 2, wherein a thread manager is configured to assign each newly created thread with a home node, wherein a thread dispatcher is configured to preferentially dispatch the newly created thread for execution on the home node, and wherein the instrumented routines record the amount of work done when the newly created thread is dispatched for execution on the home node associated with the newly created thread.

6. The method of claim 1, wherein the instrumented system events are selected from at least, a change task event, a change group event, a balance configuration event, check balance event, a verify balance event, an analyze balance event, a change balancer state event, a change configuration event, and combinations thereof.

7. The method of claim 1, wherein the instrumentation routines are configured to record data regarding the existing state of the multi-nodal computer system without disrupting other operations being performed by the multi-nodal computer system.

8. A non-transitory computer readable storage medium containing a program which, when executed, performs an operation for monitoring the performance of a multi-nodal computer system, comprising:
  instrumenting a set of system events to define a plurality of instrumented events, wherein the system events are related to the distribution of workload across each of the nodes of the multi-nodal computer system and wherein instrumenting comprises associating the system events with respective instrumentation routines which are invoked upon occurrence of the respective instrumented event;
  when an instrumented event, of the plurality of instrumented events, occurs over the course of executing a thread on the multi-nodal computer system, performing a respective instrumentation routine, wherein the instrumentation routine is configured to record data regarding the existing state of the multi-nodal computer system; and
  continuing to execute the thread after performing the instrumentation routine.

9. The non-transitory computer readable storage medium of claim 8, wherein each node of the multi-nodal computer system includes a set of one or more central processing units (CPUs) and a local memory store.

10. The non-transitory computer readable storage medium of claim 9, wherein each node of the multi-nodal computer system may access the local memory store of any other node.

11. The non-transitory computer readable storage medium of claim 9, wherein the multi-nodal computer system is configured using a non-uniform memory access (NUMA) architecture.

12. The non-transitory computer readable storage medium of claim 9, wherein a thread manager is configured to assign each newly created thread with a home node, wherein a thread dispatcher is configured to preferentially dispatch the newly created thread for execution on the home node, and wherein the instrumented routines record how often the newly created thread is dispatched for execution on the home node associated with the newly created thread.

13. The non-transitory computer readable storage medium of claim 8, wherein the instrumented system events are selected from at least, a change task event, a change group event, a balance configuration event, check balance event, a verify balance event, an analyze balance event, a change balancer state event, a change configuration event, and combinations of the foregoing.

14. The non-transitory computer readable storage medium of claim 8, wherein the instrumentation routines are configured to record data regarding the existing state of the multi-nodal computer system without disrupting other operations being performed by the multi-nodal computer system.

15. A multi-nodal computer system, comprising:
  a plurality of processors;
  a plurality of memory stores; and
  a instrumentation management tool that includes instructions which, when executed by one of the plurality of processors, cause the processor to perform operations for monitoring the performance of the multi-nodal computer system, comprising:
    instrumenting a set of system events to define a plurality of instrumented events, wherein the system events are related to the distribution of workload across each of the nodes of the multi-nodal computer system and wherein instrumenting comprises associating the system events with respective instrumentation routines which are invoked upon occurrence of the respective instrumented event;
    when an instrumented event, of the plurality of instrumented events, occurs over the course of executing a thread on the multi-nodal computer system, performing a respective instrumentation routine, wherein the instrumentation routine is configured to record data regarding the existing state of the multi-nodal computer system; and
    continuing to execute the thread after performing the instrumentation routine.

16. The multi-nodal computer system of claim 15, wherein each node of the multi-nodal computer system includes a set of one or more central processing units (CPUs) and a local memory store.

17. The multi-nodal computer system of claim 16, wherein each node of the multi-nodal computer system may access the local memory store of any other node.

18. The multi-nodal computer system of claim 16, wherein the multi-nodal computer system is configured using a non-uniform memory access (NUMA) architecture.

19. The multi-nodal computer system of claim 16, wherein a thread manager is configured to assign each newly created thread with a home node, wherein a thread dispatcher is configured to preferentially dispatch the newly created thread for execution on the home node, and wherein the instrumented routines record how often the newly created thread is dispatched for execution on the home node associated with the newly created thread.

20. The multi-nodal computer system of claim 15, wherein the instrumented system events are selected from at least, a change task event, a change group event, a balance configuration event, check balance event, a verify balance event, an analyze balance event, a change balancer state event, a change configuration event, and combinations of the foregoing.

* * * * *